(12) United States Patent
Kim et al.

(10) Patent No.: US 9,503,651 B2
(45) Date of Patent: Nov. 22, 2016

(54) APPARATUS AND METHOD FOR FINDING OPTIMAL ZOOMING SPEED

(71) Applicant: HANWHA TECHWIN CO., LTD, Changwon-si (KR)

(72) Inventors: Daebong Kim, Changwon-si (KR); Youngsang Kwon, Changwon-si (KR); Joohye Noh, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 14/805,933

(22) Filed: Jul. 22, 2015

(65) Prior Publication Data

US 2016/0094791 A1    Mar. 31, 2016

(30) Foreign Application Priority Data

Sep. 30, 2014  (KR) .......................... 10-2014-0132020

(51) Int. Cl.
  *H04N 5/232* (2006.01)
  *G02B 7/28* (2006.01)
  *G02B 7/04* (2006.01)
  *G02B 7/09* (2006.01)
  *G02B 15/00* (2006.01)

(52) U.S. Cl.
  CPC ............ *H04N 5/23296* (2013.01); *G02B 7/09* (2013.01); *G02B 7/282* (2013.01); *G02B 15/00* (2013.01)

(58) Field of Classification Search
  None
  See application file for complete search history.

(56) References Cited

U.S. PATENT DOCUMENTS

| | | | |
|---|---|---|---|
| 5,144,491 A * | 9/1992 | Ushiro | G02B 7/282 348/347 |
| 6,624,851 B1 | 9/2003 | Okajima et al. | |
| 2006/0119732 A1* | 6/2006 | Ohta | H04N 5/232 348/347 |
| 2012/0154616 A1* | 6/2012 | Sato | G02B 7/38 348/220.1 |

FOREIGN PATENT DOCUMENTS

| | | |
|---|---|---|
| JP | 9-311265 A | 12/1997 |
| KR | 10-2004-0034244 A | 4/2004 |
| KR | 10-2004-0085929 A | 10/2004 |
| KR | 10-2006-0121436 A | 11/2006 |
| KR | 10-2007-0016351 A | 2/2007 |

OTHER PUBLICATIONS

Chang et al., "Auto Focus Using Adaptive Step Size Search and Zoom Tracking Algorithm", Jan. 2005, 8 pages total, Department of Computer Science and Information Engineering National Taiwan University, Taipei, Taiwan.

* cited by examiner

*Primary Examiner* — Mark T Monk
(74) *Attorney, Agent, or Firm* — Sughrue Mion, PLLC

(57) ABSTRACT

An optimal zooming speed determining device includes: a storage to store a zooming speed at each position of a zoom lens; a tracking implementer to calculate a position of the zoom lens changed in a unit time at a zooming speed at each position of the zoom lens; a moving time calculator to calculate a difference between a position of a focus lens corresponding to a position of the zoom lens before the position of the zoom lens is changed and a position of the focus lens corresponding to the changed position of the zoom lens, and calculate a focus moving time by dividing the difference between positions of the focus lens by a highest moving speed of the focus lens; and a zooming speed determiner to reduce the zooming speed at each position of the zoom lens, if the focus moving time is greater than the unit time.

20 Claims, 6 Drawing Sheets

APPARATUS AND METHOD FOR FINDING OPTIMAL ZOOMING SPEED

CROSS-REFERENCE TO RELATED APPLICATION

This application claims priority from Korean Patent Application No. 10-2014-0132020, filed on Sep. 30, 2014, in the Korean Intellectual Property Office, the disclosure of which is incorporated herein in its entirety by reference.

BACKGROUND

1. Field

Apparatuses and methods consistent with exemplary embodiments relate to finding an optimal zooming speed, and more particularly, to determining optimal zooming speeds at respective positions of a zoom lens without deteriorating zoom tracking performance.

2. Description of the Related Art

Zoom tracking refers to movement of a zoom lens while maintaining a set focus. In other words, if a zoom lens moves, a focus lens moves together with the zoom lens to maintain a set focus.

If only a zoom lens moves and a focus lens does not move when focus is already set, a focus value determined based on a position of the zoom lens and a position of the focus lens is changed, and thus the focused object is defocused. Therefore, when a position of the zoom lens is changed, a position of the focus lens has to also be changed. If a focus lens does not move until a moving zoom lens is fixed, a longer period of time is taken to set a focus. Therefore, a zoom tracking function for respectively changing a position of the zoom lens and a position of the focus lens at a same time while maintaining a set focus is used.

Zoom tracking methods include a zoom tracking method using locus data and an auto zoom tracking method. The zoom tracking method using locus data may be used for easy zoom tracking by using locus data unique to properties of a lens when information about a distance to an object is known before a zoom lens moves. However, it is necessary to obtain information about a distance to an object in advance and, if information about a distance to an object is incorrect, the object is defocused and it is difficult to re-set focus on the object.

The auto zoom tracking method is a method of embodying zoom tracking when information about a distance to an object is unknown. According to the auto zoom tracking method, zoom tracking may be performed even if information about a distance to an object is not stored in advance. However, a field of view and exposure are changed as a zoom lens moves, and thus a focus value for auto focusing is continuously changed, and it is not technically easy to appropriately adjust the moving speed of a zoom lens based on a position of the zoom lens to maintain a set focus.

In the auto zoom tracking method, a speed calculated via a test is applied to each position of a zoom lens as a speed of changing a position of the zoom lens (referred to hereinafter as a 'zooming speed'). Here, as a zoom lens located at high zoom power moves toward higher zoom power, a range to move a focus lens in correspondence to movement of the zoom lens is rapidly widened, and thus it is necessary to rapidly reduce a zooming speed by taking into account the widened range to move the focus lens.

As described above, if a zooming speed is rapidly reduced when a zoom lens is moved toward higher zoom power, zoom tracking performance may be maintained, but it is difficult to satisfy a demand for fast zooming speed. Furthermore, since a zooming speed in each position of a zoom lens calculated using a method in the related art always utilizes values calculated via a test during a development stage, a long period of time is taken therefor, and a calculated zooming speed based on a position of a zoom lens may not allow to maintain a consistent performance

SUMMARY

Exemplary embodiments of the inventive concept provide an apparatus and method for obtaining an optimal zooming speed, which is further optimized than a zooming speed at each position of a zoom lens that could only be experimentally obtained in the related art, in a camera that embodies zoom tracking by using auto zoom tracking.

Various aspects of the inventive concept will be set forth in part in the description which follows and, in part, will be apparent from the description, or may be learned by practice of the presented embodiments.

According to one or more exemplary embodiments, there is provided an optimal zooming speed determining device which may include: a storage configured to store a zooming speed at each position of a zoom lens; a tracking implementer configured to calculate a position of the zoom lens changed in a unit time at a zooming speed at the each position of the zoom lens; a moving time calculator configured to calculate a difference between a position of a focus lens corresponding to a position of the zoom lens before the position of the zoom lens is changed and a position of the focus lens corresponding to the changed position of the zoom lens, and calculate a focus moving time by dividing the difference between positions of the focus lens by the highest moving speed of the focus lens; and a zooming speed determiner configured to reduce the zooming speed at the each position of the zoom lens stored in the storage, if the focus moving time is greater than the unit time.

The zooming speed at the each position of the zoom lens may be calculated from locus data regarding a distance between an object and a zoom lens system comprising the zoom lens and the focus lens.

The locus data may include locus data corresponding to a case at which the object is located at an infinite distance from the zoom lens system; and locus data corresponding to a case at which the object is a MOD distance apart from the zoom lens system, and the MOD distance is the smallest distance with guaranteed resolving power.

The zooming speed determiner may reduce the zooming speed based on a position of the zoom lens by changing a position of the zoom lens corresponding to each zooming speed.

At the storage, the position of the zoom lens may correspond to a section of the zoom lens which includes a plurality of positions of the zoom lens, and the zooming speed determiner may change positions of the zoom lens corresponding to respective zooming speeds.

The zooming speed determiner may sequentially change a plurality of sections of the zoom lens corresponding to the respective zooming speeds from a section of the zoom lens corresponding to the lowest zooming speed to a section of the zoom lens corresponding to the highest zooming speed. Here, each of the sections of the zoom lens may include a plurality of positions of the zoom lens.

The zooming speed determiner may cumulatively change a plurality of sections of the zoom lens corresponding to the respective zooming speeds by a pre-set margin value from a section of the zoom lens corresponding to the lowest zooming speed to a section of the zoom lens corresponding to the highest zooming speed.

The zooming speed determiner may cumulatively change the plurality of sections of the zoom lens corresponding to the respective zooming speeds by the margin value from a section of the zoom lens corresponding to the lowest zooming speed to a section of the zoom lens corresponding to a reference zooming speed, and the reference zooming speed is a zooming speed lower than the highest zooming speed.

The reference zooming speed may be a zooming speed corresponding to a position of the zoom lens at which a change of a range of the focus lens is greater than a pre-set value, and the range of the focus lens may be a range to move the focus lens as the zoom lens moves.

The zooming speed determiner may cumulatively change the plurality of sections of the zoom lens corresponding to the respective zooming speeds by a pre-set inverse margin value from a section of the zoom lens corresponding to a speed higher than the reference zooming speed to a section of the zoom lens corresponding to the highest zooming speed.

According to one or more exemplary embodiments, there is a method of determining an optimal zooming speed. The method may include: storing a zooming speed at each position of a zoom lens; calculating a position of the zoom lens changed in a unit time at a zooming speed at the each the position of the zoom lens; calculating a difference between a position of a focus lens corresponding to a position of the zoom lens before the position of the zoom lens is changed and a position of the focus lens corresponding to the changed position of the zoom lens, and calculating a focus moving time by dividing the difference between positions of the focus lens by the highest moving speed of the focus lens; and reducing the zooming speed at the each position of the zoom lens, if the focus moving time is greater than the unit time.

The zooming speed at the each position of the zoom lens may be calculated from locus data regarding a distance between an object and a zoom lens system comprising the zoom lens and the focus lens.

The locus data includes locus data corresponding to a case at which the object is located at an infinite distance from the zoom lens system; and locus data corresponding to a case at which the object is a MOD distance apart from the zoom lens system, and the MOD distance is the minimum distance with guaranteed resolving power.

The zooming speed based on a position of the zoom lens may be reduced by changing a position of the zoom lens corresponding to each zooming speed.

The position of the zoom lens may correspond to a section of the zoom lens which includes a plurality of positions of the zoom lens, and the method may further include changing positions of the zoom lens corresponding to respective zooming speeds.

The method may further include sequentially changing a plurality of sections of the zoom lens corresponding to the respective zooming speeds from a section of the zoom lens corresponding to the lowest zooming speed to a section of the zoom lens corresponding to the highest zooming speed.

The method may further include cumulatively changing a plurality of sections of the zoom lens corresponding to the respective zooming speeds by a pre-set margin value from a section of the zoom lens corresponding to the lowest zooming speed to a section of the zoom lens corresponding to the highest zooming speed.

The cumulatively changing may include cumulatively changing the plurality of sections of the zoom lens corresponding to the respective zooming speeds by the margin value from a section of the zoom lens corresponding to the lowest zooming speed to a section of the zoom lens corresponding to a reference zooming speed, and the reference zooming speed is a zooming speed lower than the highest zooming speed.

The reference zooming speed may be a zooming speed corresponding to a position of the zoom lens at which a change of a range of the focus lens is greater than a pre-set value, and the range of the focus lens may be a range to move the focus lens as the zoom lens moves.

The method may further include cumulatively changing the plurality of sections of the zoom lens corresponding to the respective zooming speeds by a pre-set inverse margin value from a section of the zoom lens corresponding to a speed higher than the reference zooming speed to a section of the zoom lens corresponding to the highest zooming speed.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION OF THE EXEMPLARY EMBODIMENTS

Figure 1:
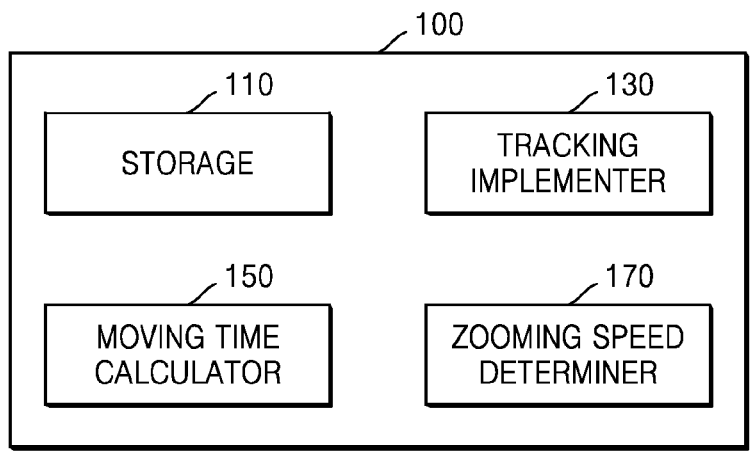
FIG. 1 is a block diagram showing an optimal zooming speed determining device according to an exemplary embodiment.

Reference will now be made in detail to exemplary embodiments which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the drawings, to explain various aspects of the inventive concept. Expressions such as "at least one of," when preceding a list of elements, modify the entire list of elements and do not modify the individual elements of the list.

In the description of the exemplary embodiments, certain detailed explanations of the related art may be omitted when it is deemed that they may unnecessarily obscure the essence of the inventive concept.

Throughout the specification, when a portion "includes" an element, another element may be further included, rather than excluding the existence of the other element, unless otherwise described.

The term "zoom lens system" collectively refers to lenses that are arranged in a camera which has a zoom tracking function and receives light and transmit the light to an image sensor. The zoom lens system may include a zoom lens and a focus lens, and may further include a front lens and an iris lens.

In the descriptions below, when positions of a zoom lens and a focus lens are changed, the basic unit of the positions is a step, where a max step refers to the largest number of steps that the zoom lens or the focus lens may move in a unit time.

FIG. 1 is a block diagram showing an optimal zooming speed determining device 100 according to an exemplary embodiment.

The optimal zooming speed determining device 100 for an auto focusing (AF) camera shown in FIG. 1 may include a storage 110, a tracking implementer 130, a moving time calculator 150, and a zooming speed determiner 170.

The storage 110 stores zooming speeds set according to positions of a zoom lens.

Table 1 shows examples of the zooming speeds set according to the positions of a zoom lens that are stored in the storage 110.

TABLE 1

| Zooming Speed | Position of Zoom Lens |
| --- | --- |
| 32 (Highest) | 0~956 |
| 31 | 957~1258 |
| 30 | 1259~1381 |
| 29 | 1382~1457 |
| 28 | 1458~1516 |
| 27 | 1517~1566 |
| 26 | 1567~1609 |
| 25 | 1610~1649 |
| 24 | 1650~1684 |
| 23 | 1685~1715 |
| 22 | 1716~1741 |
| 21 | 1742~1764 |
| 20 | 1765~1783 |
| 19 | 1784~1799 |
| 18 | 1800~1812 |
| 17 | 1813~1823 |
| 16 | 1824~1832 |
| 15 | 1833~1840 |
| 14 | 1841~1847 |
| 13 | 1848~1853 |
| 12 | 1854~1858 |
| 11 | 1859~1863 |
| 10 | 1864~1867 |
| 9 | 1868~1870 |
| 8 | 1871~1873 |
| 7 | 1874~1876 |
| 6 | 1877~1878 |
| 5 | 1879~1880 |
| 4 | 1881~1882 |
| 3 | 1883~1884 |

TABLE 1-continued

| Zooming Speed | Position of Zoom Lens |
| --- | --- |
| 2 | 1885~1886 |
| 1 | 1887 |

Zooming speeds set according to positions of a zoom lens may be experimentally obtained from a camera including a zoom lens system. The zooming speeds set according to positions of a zoom lens may be obtained by determining zoom tracking performance while changing a distance between an object and a zoom lens system (referred to hereinafter as 'a distance to an object'), a position of the zoom lens and a position of a focus lens. The determination of zoom tracking performance will be described in detail below with descriptions of the tracking implementer 130 and the moving time calculator 150.

The zooming speed is sequentially changed as a position of a zoom lens is changed to minimize distortion of an image of an object resulting from the zooming while the object is being focused, when the present embodiment is applied to a camera. Referring to Table 1, a zooming speed at each position of a zoom lens is sequentially changed from 32 steps/VD to 1 step/VD as the position of the zoom lens increases.

An auto exposure (AE) algorithm, an auto focusing (AF) algorithm, and an auto white balance (AWB) algorithm embodied by a camera are configured to operate according to image frames. If the camera is operated at 30 frames per second (FPS), a unit time for a single image frame is 1/30 seconds. Here, 1/30 seconds is defined as 1VD, where the length of VD may vary depending on the FPS setting of images.

Zooming speeds set according to positions of a zoom lens stored in the storage 110 may not only be experimentally obtained as described above, but also be quickly obtained based on locus data indicating a relationship between positions of a zoom lens and positions of a focus lens.

Figure 2:
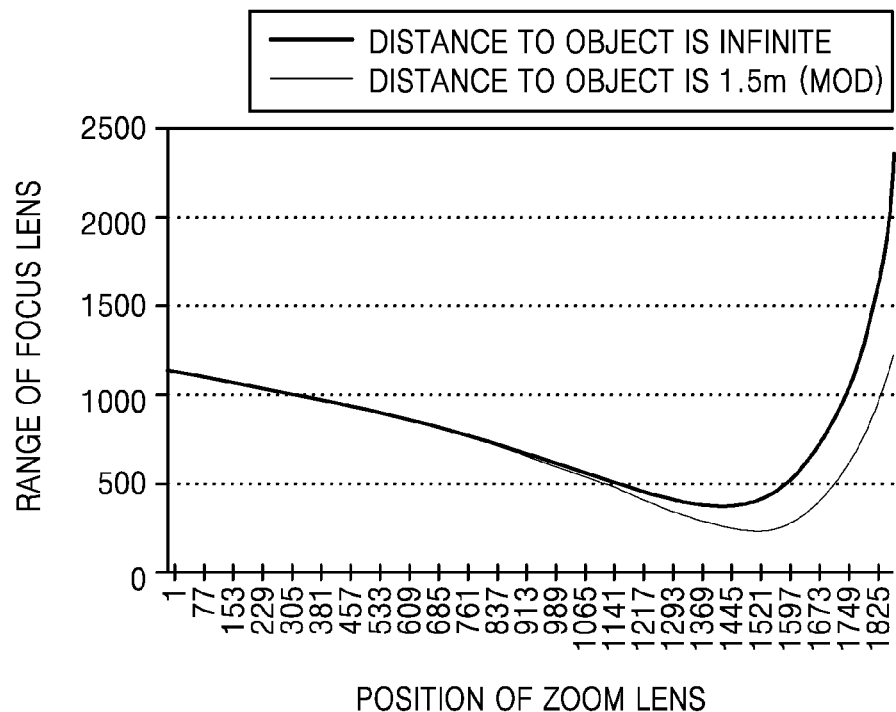
FIG. 2 is a locus data graph showing a case in which an object is located at an infinite distance from a zoom lens system and a case in which an object is located at 1.5 m apart from the zoom lens system, according to an exemplary embodiment.

FIG. 2 is a locus data graph showing a case in which an object is located at an infinite distance from a zoom lens system and a case in which an object is located 1.5 m apart from the zoom lens system.

In FIG. 2, 1.5 m is the smallest distance between an object and a zoom lens system at which resolving power of a camera may be guaranteed (referred to hereinafter as a 'MOD distance'), where specific numbers may vary depending on the characteristics of a camera lens to which a zooming speed at each position of a zoom lens calculated according to the inventive concept is applied or the characteristics of other devices.

In the graph shown in FIG. 2, the locus data graph corresponding to the case at which the object is located at an infinite distance from the zoom lens system and the locus data graph corresponding to the case at which the object is located 1.5 m apart from the zoom lens system become boundaries that define locations for general locus data graphs. In other words, a large number of locus data graphs corresponding to cases in which distances between the zoom lens system and the object are 2 m, 3 m, and 5 m may exist between the two locus data graphs of FIG. 2.

Referring to FIG. 2, when a position of the zoom lens is at the 1521 step, a position of the focus lens is at the 250 step, and the object is 1.5 m apart from the zoom lens system, focus is set. Here, the expression "focus is set" indicates that, as a position of the zoom lens, a position of the focus lens, and a distance between the object and the zoom lens system have particular values, a focus value is maximized, and thus, when a user sees the object on a camera, the object seen by the user is clear.

In the graph shown in FIG. 2, zoom power of the zoom lens increases as a position of the zoom lens (horizontal axis) increases, whereas zoom power of the zoom lens decreases as a position of the zoom lens (horizontal axis) decreases. Furthermore, when a position of the zoom lens increases, it is said that the zoom lens moves toward the telephoto end. On the contrary, when a position of the zoom lens decreases, it is said that the zoom lens moves toward the wide angle end.

Figure 3:
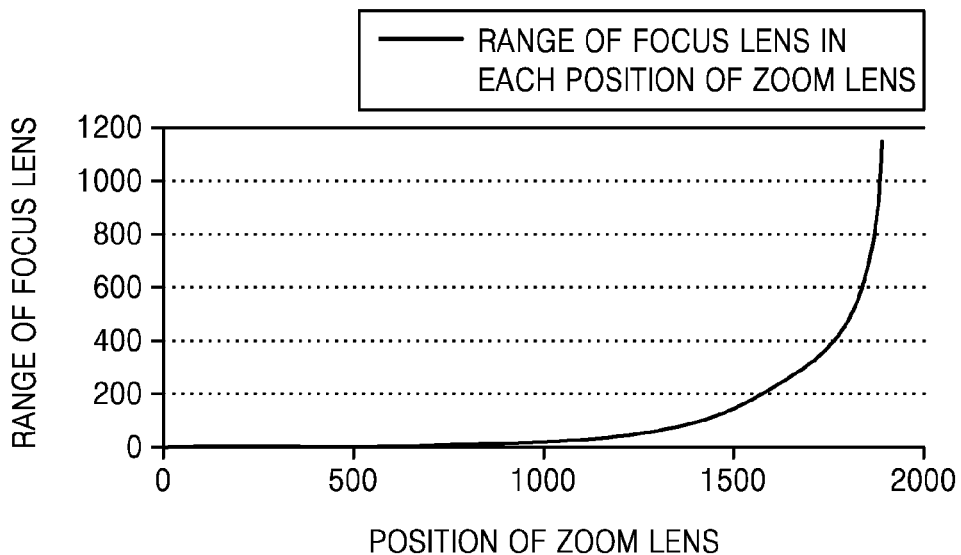
FIG. 3 is a graph showing a range to move a focus lens as a zoom lens moves (referred to hereinafter as 'range of a focus lens'), according to an exemplary embodiment.

FIG. 3 is a graph showing a range to move a focus lens as a zoom lens moves (referred to hereinafter as 'range of a focus lens').

The graph shown in FIG. 3 is based on the graph of FIG. 2, that is, the range of the focus lens at each position of a zoom lens may be calculated by subtracting a position of the focus lens corresponding to a case in which a distance between the object and the zoom lens is 1.5 m from a position of the focus lens corresponding to a case in which a distance between the object and the zoom lens is infinite.

Referring to FIG. 3, a range of the focus lens is close to 0 until a position of the zoom lens is close to 1000 steps. However, after a position of the zoom lens exceeds 1000 steps, a range of the focus lens becomes significantly wide. This phenomenon is the reason to reduce a zooming speed in a nonlinear fashion as a zoom lens moves toward the telephoto end.

$$S(z_p) \approx S_{max} - \left( \frac{S_{max} * f_d(z_p)}{f_d(z_{max})} \right) \qquad \text{[Equation 1]}$$

$$f_d(z_p) = f_{inf.}(z_p) - f_{mod}(z_p) \qquad \text{[Equation 2]}$$

Equation 1 and Equation 2 show an equation for calculating a position of a zoom lens and an equation for calculating a range of a focus lens according to a position of the zoom lens, respectively.

$S(z_p)$ indicates a zooming speed at each position of the zoom lens, where $z_p$ is a variable indicating the position of the zoom lens. $S_{max}$ indicates the maximum value of a zooming speed of a zoom motor for moving the zoom lens, where $S_{max}$ may vary depending on the design of the zoom motor.

$f_d(z_p)$ indicates a range of the focus lens according to a position of the zoom lens and has a similar shape as the graph shown in FIG. 3.

$f_{inf}(z_p)$ indicates a position of the focus lens according to a position of the zoom lens when an object is located at an infinite distance from a zoom lens system. Referring to FIG. 2, $f_{inf}(z_p)$ indicates a graph having larger values along the vertical axis between the two graphs.

$f_{mod}(z_p)$ indicates a position of the focus lens according to a position of the zoom lens when the object is located at the MOD distance from the zoom lens system. Referring to FIG. 2, the $f_{mod}(z_p)$ indicates a graph having smaller values along the vertical axis between the two graphs.

$f_d(z_{max})$ indicates a range of the focus lens when the zoom lens is at the telephoto end. Referring to FIG. 3, $f_d(z_{max})$ indicates a range of the focus lens when a position of the zoom lens at the rightmost position (1887 steps) on the horizontal axis and is a constant.

$$S(z_p) \approx S_{max} - \left( \frac{S_{max} * (f_{inf.}(z_p) - f_{mod}(z_p))}{f_d(z_{max})} \right) \qquad \text{[Equation 3]}$$

$$S(z_p) \approx a - b * (f_{inf.}(z_p) - f_{mod}(z_p)) \qquad \text{[Equation 4]}$$

Equation 3 may be calculated by substituting Equation 2 into Equation 1 and Equation 3 may be simplified as shown in Equation 4. Since $S_{max}$ and $S_{max}/f_d(z_{max})$ have fixed values, $S_{max}$ and $S_{max}/f_d(z_{max})/f_d(z_{max})$ may be substituted by a and b, respectively. Referring to Equation 2, $f(z_p)$ is defined as a value obtained by subtracting $f_{mod}(z_p)$ from $f_{inf}(z_p)$, and thus a zooming speed at each position of a zoom lens may be expressed as a linear function regarding a range of a focus lens.

Figure 4:
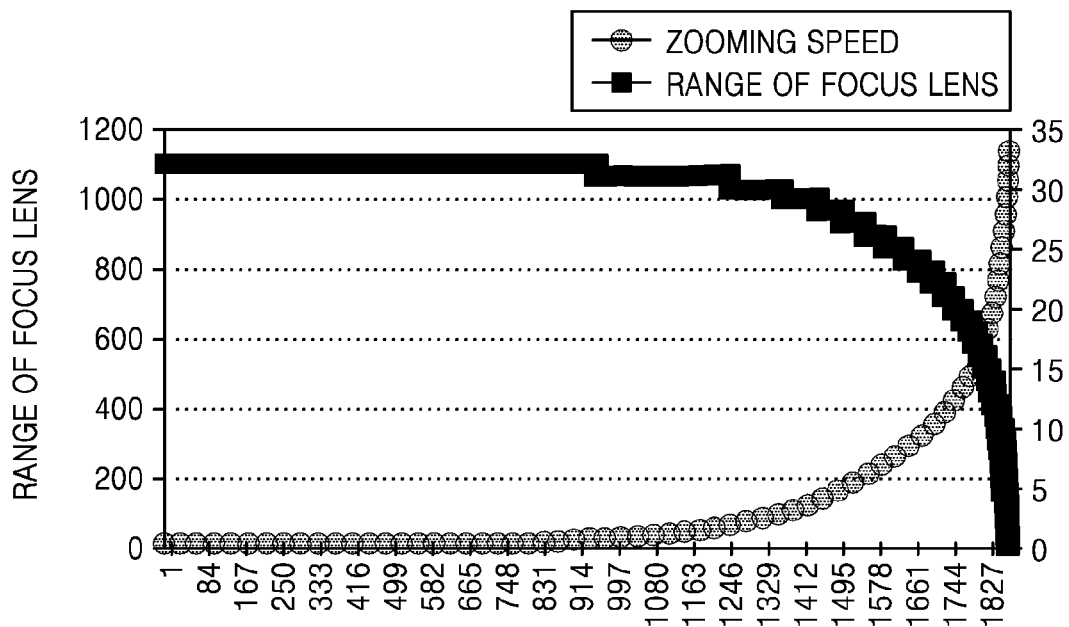
FIG. 4 is a graph exemplifying a range of the focus lens based on a position of a zoom lens and a zooming speed at each position of the zoom lens calculated using Equation 4, according to an exemplary embodiment.

FIG. 4 is a graph exemplifying a range of the focus lens according to a position of a zoom lens and a zooming speed at each position of the zoom lens calculated using Equation 4.

The graph indicating a range of the focus lens according to a position of a zoom lens shown in FIG. 4 is identical to the graph shown in FIG. 3, where a range of the focus lens according to a position of the zoom lens becomes significantly wide after a position of the zoom lens exceeds 1163 steps, whereas a zooming speed at each position of the zoom lens calculated according to Equation 4 significantly decreases after a position of the zoom lens exceeds 1163 steps.

1163 step, which is the position of the zoom lens from which a range of the focus lens becomes significantly wide, is an exemplary value that may vary depending on lens characteristics of a camera, and the position of the zoom lens from which a range of the focus lens becomes significantly wide may vary from one AF camera to another.

A zooming speed at each position of a zoom lens calculated according to Equations 1 through 4 may be quickly approximated from property values unique to a camera, such as a locus data graph or the highest zooming speed Smax of a zoom motor only.

Furthermore, the zooming speed at each position of a zoom lens calculated according to Equations 1 through 4 may be determined as an optimal zooming speed without being additionally tuned by the zooming speed determiner 170 as described below.

When the zooming speed according to the inventive concept is applied to a camera, the highest zooming speed may be faster than 32 steps/VD based on performance of a zoom motor for moving a zoom lens included in the camera, where a position of the zoom lens may become greater than or less than 1887 steps based on a size of a zoom lens system.

The tracking implementer 130 calculates respective positions of a zoom lens changed per unit time at zooming speed at each position of the zoom lens. Here, the unit time may be the VD or may be in milliseconds or other time units based on preset values.

Referring to Table 1, when a position of the zoom lens is 0 step, a corresponding zooming speed is 32 steps/VD. Therefore, a position of the zoom lens is 32 steps after a unit time (1 VD) is elapsed. Furthermore, since a zooming speed is 18 steps/VD when a position of the zoom lens is at 1800 steps, a position of the zoom lens after the unit time is elapsed is 1818 steps.

The tracking implementer 130 calculates positions of the zoom lens by repeatedly performing the above-stated operations. During the calculation of positions of the zoom lens, a starting point is not limited to a particular position of the zoom lens. However, to easily determine the deterioration of zoom tracking performance that occurs when a position of the zoom lens is changed from a wide angle end toward a telephoto end, the calculation of the positions of the zoom lens may be started when a position of the zoom lens is 0.

The number of positions of the zoom lens calculated by the tracking implementer 130 is a value obtained by adding 1 to the number of elapsed unit times. Referring to FIG. 1, if a position of the zoom lens is changed from 0 step to 1887 steps by the tracking implementer 130 after 89 VDs, calculated positions of the zoom lens include 0, 32, 64, . . . , 1887, and thus the total number of the calculated positions of the zoom lens is 90.

The moving time calculator 150 calculates a difference between a position of the focus lens corresponding to a position of the zoom lens before being changed and a position of the focus lens corresponding to the changed position of the zoom lens, and calculates a focus moving time by dividing the difference between positions of the focus lens by the highest moving speed of the focus lens. Here, the highest moving speed of the focus lens may be selected from among a plurality of moving speeds allowed in a camera which implements the optimal zooming speed determining device 100 therein, according to an exemplary embodiment.

The difference between a position of the focus lens corresponding to a position of the zoom lens before the positions of the zoom lens are changed in the tracking implementer 130 and a position of the focus lens corresponding to the changed position of the zoom lens calculated by the moving time calculator 150 depends on a locus data graph as shown in FIG. 2. Furthermore, the moving time calculator 150 may store the highest moving speed of the focus lens in advance to calculate a focus moving time.

For example, referring to FIG. 2, it is assumed that a distance between an object and a zoom lens is determined as infinite, a position of the zoom lens is changed from 1800 to 1815 after 1 VD, it is necessary to change a position of the focus lens from 1225 to 1334 based on the change of the position of the zoom lens, and the highest moving speed of the focus lens is 90 steps/VD.

If automatic zoom tracking is correctly embodied, a position of the focus lens should be at 1334 steps when a position of the zoom lens is at 1815 steps. However, although 1 VD is elapsed to change a position of the zoom lens from 1800 steps to 1815 steps, a difference between positions of the focus lens is only 109 steps and the highest moving speed of the focus lens is 90 steps/VD, at least 2VDs are elapsed to change a position of the focus lens from 1225 steps to 1334 steps.

In other words, although a time that elapses for changing a position of the zoom lens is 1 VD based on the definition of a zooming speed, at least 2VDs are elapsed to change a position of the focus lens, and thus a zoom motor for moving the zoom lens does not operate during a time (1 VD or longer) in which change of a position of the focus lens is completed.

Here, the 2VDs is a focus moving time calculated by the moving time calculator 150. In other words, a focus moving time may be defined as a value obtained by dividing a difference between positions of the focus lens to be changed to maintain focus by the highest moving speed of the focus lens or a value obtained by rounding up the divided value at the tenth's position.

On the contrary, referring to FIG. 2, if it is determined that the distance between the object and the zoom lens is the MOD distance, another locus data graph is applied, and thus a different result may be obtained.

Referring to the locus data graph at the MOD distance in FIG. 2, when a position of the zoom lens is changed from 1800 to 1815, it is necessary to change a position of the focus lens from 820 to 900. Here, since a difference between positions of the focus lens is less than the highest moving speed of the focus lens, the focus moving time may be 1 VD.

The moving time calculator 150 may record the number of times that a zoom motor stops while a focusing motor is operating as a skip counter. The number of times that a zoom motor stops while a focusing motor is operating as a skip counter is identical to the number of times that deteriorations of zoom tracking performance occurred. The number of times that deteriorations of zoom tracking performance occurred that is recorded by the moving time calculator 150 may be transmitted to the zooming speed determiner 170. The zooming speed determiner 170 may reduce a zooming speed at each position of the zoom lens stored in the storage 110 or determine the zooming speed according to the position of the zoom lens as an optimal zooming speed according to the position of the zoom lens by using the number of times that deteriorations of zoom tracking performance occurred that is transmitted from the moving time calculator 150.

As described above with reference to FIG. 2, a large number of locus data graphs may exist between the locus data graph corresponding to a case at which an object is located at an infinite distance from a zoom lens system and the locus data corresponding to a case at which the object is located 1.5 m apart from the zoom lens system.

The moving time calculator 150 calculates not only locus data graphs corresponding to the case at which the object is located at an infinite distance from the zoom lens system and the case at which the object is located at the MOD distance from the zoom lens system, but also focus moving times based on the respective locus data graphs, such that different zooming speeds may be applied to a camera according to distances to the object when the inventive concept is embodied by a camera.

If a focus moving time calculated by the moving time calculator 150 is greater than a unit time, the zooming speed determiner 170 reduces a zooming speed at each position of the zoom lens stored in the storage 110.

Comparison between a focus moving time and a unit time is performed with respect to every focus moving time calculated by the moving time calculator 150. If every focus moving time is identical to or less than the unit time, the zooming speed determiner 170 determines a zooming speed at each position of the zoom lens stored in the storage 110 as an optimal zooming speed according to a position of the zoom lens.

If a particular focus moving time from among a plurality of focus moving times is greater than the unit time, the zooming speed determiner 170 reduces a zooming speed at each position of the zoom lens stored in the storage 110.

The skip counter counts the number of times as a focus moving time may be greater than a unit time. If the number of times counted by the skip counter of the moving time calculator 150 is within a preset number of times, the zooming speed determiner 170 may determine that zoom tracking performance is not affected by the corresponding focus moving time, and thus the zooming speed determiner 170 may determine a zooming speed at each position of the zoom lens stored in the storage 110 as an optimal zooming speed at each position of the zoom lens.

As zooming speed at each position of the zoom lens is reduced by the zooming speed determiner 170, a difference between positions of the zoom lens that are changed every unit time is reduced, and thus a difference between positions of the focus lens is also reduced. Therefore, when a position of the zoom lens is changed in a unit time, a position of the focus lens may be prevented from being changed in a time period that is greater than the unit time.

Figure 5:
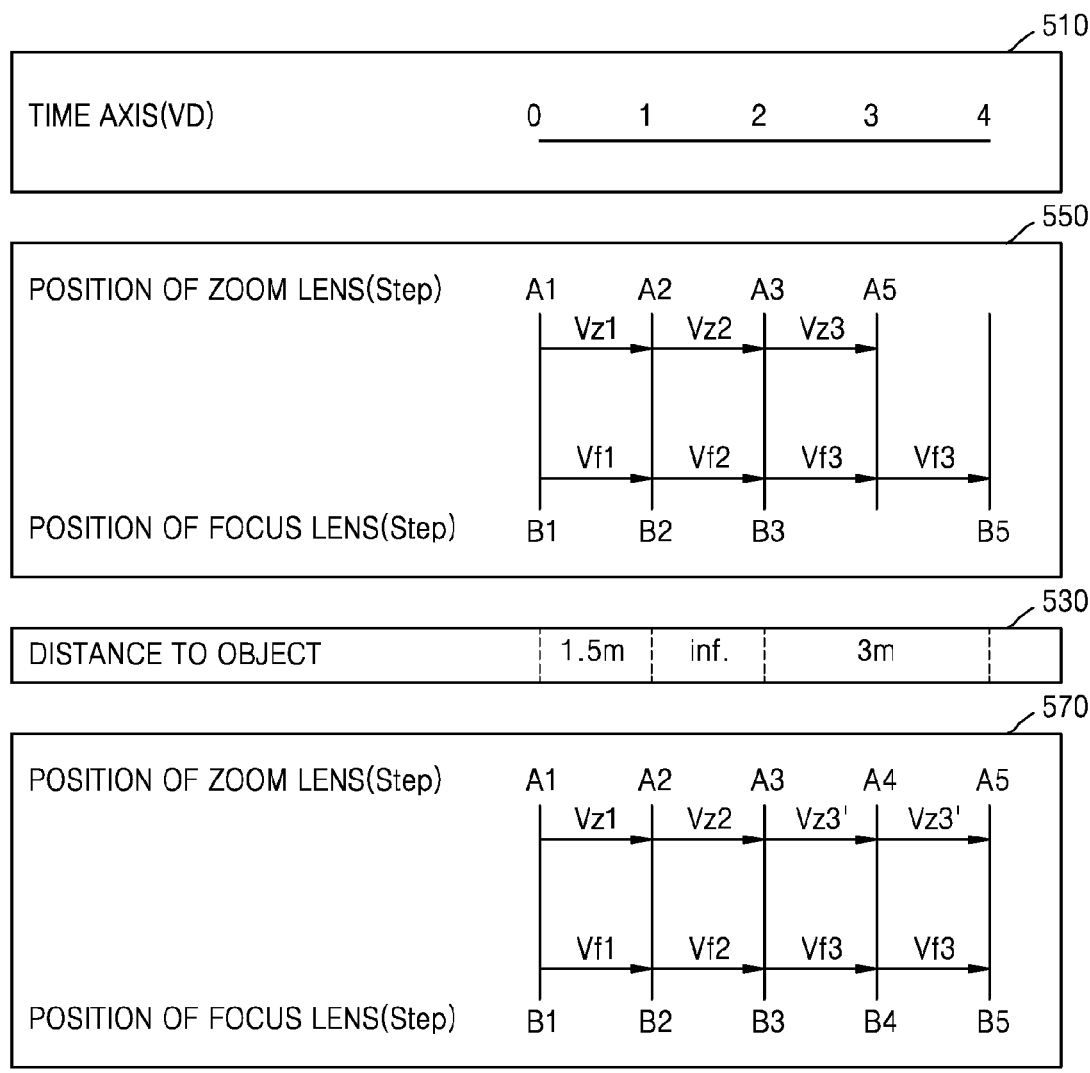
FIG. 5 is a diagram showing that a zooming speed at each position of a zoom lens is reduced by the zooming speed determiner, according to an exemplary embodiment.

FIG. 5 is a diagram showing that a zooming speed at each position of a zoom lens is reduced by the zooming speed determiner 170, according to an exemplary embodiment.

FIG. 5 shows a time axis 510, an object distance 530, a zooming speed 550 according to a position of a zoom lens before zooming speed is reduced, and a zooming speed 570 according to a position of the zoom lens after the zooming speed is reduced.

The time axis 510 indicates a time at a position of the zoom lens and a position of the focus lens in the zooming speed 550 at each position of the zoom lens before the zooming speed is reduced and the zooming speed 570 at each position of the zoom lens after the zooming speed is reduced, where a unit of the time axis 510 is VD.

The object distance 530 indicates a distance between an object and a zoom lens system and is information necessary for specifying locus data graphs needed for finding positions of the zoom lens that are changed after a unit time VD is elapsed from position of the zoom lens before the positions of the zoom lens are changed in the tracking implementer 130.

In FIG. 5, positions A1 through A5 of the zoom lens before being changed and positions A1 through A5 of the focus lens before being changed are determined based on locus data graphs as shown in FIG. 2, where the determination of a distance to the object is performed at every unit time.

The zooming speed 550 according to a position of the zoom lens before the zooming speed is reduced indicates zooming speed at each position of the zoom lens before the zooming speed is decelerated by the zooming speed determiner 170. Vz and Vf indicate a zooming speed and a moving speed of the focus lens that may vary depending on locus data graphs shown in FIG. 2, a zoom motor, and a focusing motor, respectively.

Referring to FIG. 5, when a distance to an object is 3 m, it is necessary to change a position of the focus lens from B3 to B5 in 1 VD while a position of the zoom lens is changed from A3 to A5 in 1 VD. However, since a difference between positions of the focus lens exceeds the range of the focus lens, a position of the focus lens is changed from B3 to B5 in 2VDs.

The zooming speed 570 according to a position of the zoom lens after the zooming speed is reduced indicates a zooming speed at each position of the zoom lens after the zooming speed is reduced by the zooming speed determiner 170. When a distance to an object is 3 m, while a position of the zoom lens is changed from A3 to A4 in 1 VD, a position of the focus lens is changed from B3 to B4 in 1VD. In the same regard, while a position of the zoom lens is changed from A4 to A5 in 1 VD, a position of the focus lens is changed from B4 to B5 in 1VD.

The zoom lens and the focus lens are located at the positions A5 and B5 both at the zooming speed 550 according to a position of the zoom lens before the zooming speed is reduced and at the zooming speed 570 according to a position of the zoom lens after the zooming speed is reduced.

However, referring to the time axis 510, the zooming speed 570 according to a position of the zoom lens that is reduced by the zooming speed determiner 170 after 4VDs is elapsed is appropriately reduced at the position A3 (that is, Vz3>Vz3'), and thus a position of the zoom lens and the position of the focus lens may reach intended positions A5 and B5 in 2VDs without changing only a position of the zoom lens from A3 to A5 in 1VD. Therefore, deterioration of zoom tracking performance may be prevented.

Referring to FIG. 5, a particular zooming speed according to a position of a zoom lens that is reduced by the zooming speed determiner 170 is calculated based on the locus data graph shown in FIG. 2 and performance of a zoom motor. Furthermore, a zooming speed may only be reduced within a preset range from an original zooming speed to prevent a user from becoming unpleasant due to rapid zooming speed reduction.

Based on the graph shown in FIG. 4, since a zooming speed should be gradually reduced as a zoom lens moves toward the telephoto end, the zooming speed determiner 170 may reduce a zooming speed at each position of the zoom lens that is closer to the telephoto end than a position of the zoom lens corresponding to the reduced zooming speed to a speed slower than the reduced zooming speed.

TABLE 2

| Zooming Speed | Position of Zoom Lens | Position of Zoom Lens (Tuned) |
|---|---|---|
| 32(Max.) | 0~956 | 0~951 |
| 31 | 957~1258 | 952~1253 |
| 30 | 1259~1381 | 1254~1376 |
| 29 | 1382~1457 | 1377~1452 |
| 28 | 1458~1516 | 1453~1511 |
| 27 | 1517~1566 | 1512~1561 |
| 26 | 1567~1609 | 1562~1604 |
| 25 | 1610~1649 | 1605~1644 |
| 24 | 1650~1684 | 1645~1679 |
| 23 | 1685~1715 | 1680~1706 |
| 22 | 1716~1741 | 1711~1736 |
| 21 | 1742~1764 | 1737~1759 |
| 20 | 1765~1783 | 1760~1778 |
| 19 | 1784~1799 | 1779~1790 |
| 18 | 1800~1812 | 1795~1807 |
| 17 | 1813~1823 | 1808~1818 |
| 16 | 1824~1832 | 1819~1827 |
| 15 | 1833~1840 | 1828~1835 |
| 14 | 1841~1847 | 1836~1842 |
| 13 | 1848~1853 | 1843~1848 |
| 12 | 1854~1858 | 1849~1853 |
| 11 | 1859~1863 | 1854~1858 |
| 10 | 1864~1867 | 1859~1862 |
| 9 | 1868~1870 | 1863~1865 |
| 8 | 1871~1873 | 1866~1868 |
| 7 | 1874~1876 | 1869~1871 |
| 6 | 1877~1878 | 1872~1873 |
| 5 | 1879~1880 | 1874~1875 |
| 4 | 1881~1882 | 1876~1877 |
| 3 | 1883~1884 | 1878~1879 |
| 2 | 1885~1886 | 1880~1881 |
| 1 | 1887 | 1882~1887 |

Furthermore, in the case of a zooming speed at a particular position of a zoom lens that is reduced by the zooming speed determiner 170, not only the zooming speed, but also a position of the zoom lens moving at the zooming speed may be changed as shown in Table 2 above.

Referring to Table 2, a zooming speed is 5 steps/VD when a position of the zoom lens is 1880 steps. However, after positions of the zoom lens are changed at once, a zooming speed is reduced to 2 steps/VD when a position of the zoom lens is 1880 steps.

In the case of reducing zooming speed at each position of a zoom lens by changing the position of the zoom lens, positions of the zoom lens are successively changed with respect to the respective zooming speeds, and thus it is not necessary to check whether a zooming speed changed by the zooming speed determiner 170 is within a pre-set range around an original zooming speed.

For simplification of the specification, a zooming speed at each position (section) of a zoom lens that is either experimentally calculated or calculated according to Equation 4 may be referred to as a "primary zooming speed," whereas a zooming speed obtained by tuning a primary zooming speed by reducing a zooming speed at each position (section) of a zoom lens or changing a position (section) of the zoom lens moving at a zooming speed may be referred to as a "secondary zooming speed."

Figure 6:
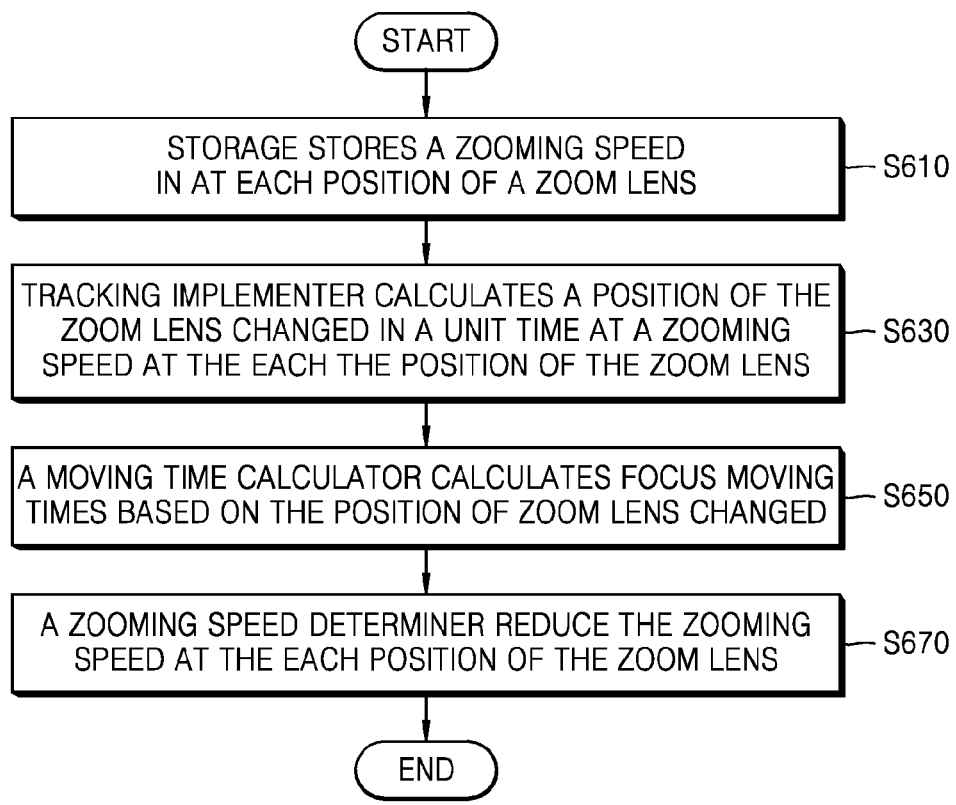
FIG. 6 is a flowchart showing a method of determining an optimal zooming speed according to another exemplary embodiment.

FIG. 6 is a flowchart showing a method of determining an optimal zooming speed according to another exemplary embodiment.

Descriptions of components identical to those shown in FIG. 1 will be omitted.

A storage stores a zooming speed at each position of a zoom lens (operation S610).

A tracking implementer calculates a position of the zoom lens changed at a zooming speed set according to each position of a zoom lens in a unit time (operation S630).

A moving time calculator calculates a difference between a position of the focus lens corresponding to a position of the zoom lens before being changed and a position of the focus lens corresponding to a changed position of the zoom lens, and calculates a focus moving time by dividing the difference between positions of the focus lens by the highest moving speed of the focus lens (operation S650).

If a focus moving time calculated by the moving time calculator is greater than a unit time, a zooming speed determiner reduces a zooming speed at each position of a zoom lens stored in the storage (operation S670).

Figure 7:
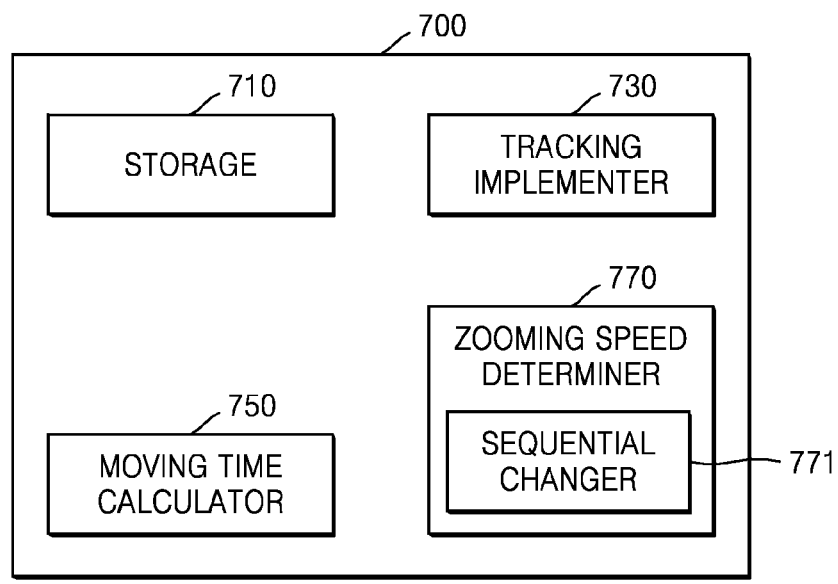
FIG. 7 is a block diagram showing an optimal zooming speed determining device according to another exemplary embodiment.

FIG. 7 is a block diagram showing an optimal zooming speed determining device according to another exemplary embodiment.

Descriptions of components identical to those shown in FIG. 1 will be omitted.

A storage 710 stores a zooming speed set according to each position of a zoom lens. The zooming speed at each position of a zoom lens (primary zooming speed) stored in the storage 710 may be experimentally obtained by using a camera and a measuring device that are embodied as hardware or may be quickly obtained according to Equation 4 stated above.

The zooming speed at each position of a zoom lens stored in the storage 710 does not exactly correspond to the position of the zoom lens, and a plurality of positions of the zoom lens corresponding to a single zooming speed. Therefore, positions of the zoom lens corresponding to a zooming speed may be expressed as a section of a zoom lens. For example, referring to Table 1, when a zooming speed is 32 steps/VD, a corresponding section of a zoom lens is from 0 to 956. When a zooming speed is 5 steps/VD, a corresponding section of a zoom lens is from 1879 to 1880.

A tracking implementer 730 calculates a position of the zoom lens changed at a zooming speed at each position of a zoom lens in a unit time.

A moving time calculator 750 calculates a difference between a position of the focus lens corresponding to a position of the zoom lens before the position of the zoom lens is changed in the tracking implementer and a position of the focus lens corresponding to the changed position of the zoom lens, and also calculates a focus moving time by dividing the difference by the highest moving speed of the focus lens.

A zooming speed determiner 770 includes a sequential changer 771 and, if a focus moving time calculated by the moving time calculator 750 is greater than a unit time, reduces a zooming speed at each position of a zoom lens stored in the storage 710 (calculation of a secondary zooming speed).

The zooming speed at each position of a zoom lens may be reduced by changing widths of sections of a zoom lens at once, where the sequential changer 771 may cumulatively change widths of sections of the zoom lens by a particular value from a section 1887 of the zoom lens corresponding to the lowest zooming speed, thereby further reducing a zooming speed at a zooming speed faster than those shown in Table 2.

TABLE 3

| Zooming Speed | Position of Zoom Lens | Position of Zoom Lens (Tuned) | Margin Value, Section Movement Value |
|---|---|---|---|
| 32(Max.) | 0~956 | 0~806 | +5, Shift 155 |
| 31 | 957~1258 | 807~1113 | +5, Shift 150 |
| 30 | 1259~1381 | 1114~1241 | +5, Shift 145 |
| 29 | 1382~1457 | 1242~1322 | +5, Shift 140 |
| 28 | 1458~1516 | 1323~1386 | +5, Shift 135 |
| 27 | 1517~1566 | 1387~1441 | +5, Shift 130 |
| 26 | 1567~1609 | 1442~1489 | +5, Shift 125 |
| 25 | 1610~1649 | 1490~1534 | +5, Shift 120 |
| 24 | 1650~1684 | 1535~1574 | +5, Shift 115 |
| 23 | 1685~1715 | 1575~1610 | +5, Shift 110 |
| 22 | 1716~1741 | 1611~1641 | +5, Shift 105 |
| 21 | 1742~1764 | 1642~1664 | +5, Shift 100 |
| 20 | 1765~1783 | 1665~1688 | +5, Shift 95 |
| 19 | 1784~1799 | 1689~1709 | +5, Shift 90 |
| 18 | 1800~1812 | 1710~1727 | +5, Shift 85 |
| 17 | 1813~1823 | 1728~1743 | +5, Shift 80 |
| 16 | 1824~1832 | 1744~1757 | +5, Shift 75 |
| 15 | 1833~1840 | 1758~1770 | +5, Shift 70 |
| 14 | 1841~1847 | 1771~1782 | +5, Shift 65 |
| 13 | 1848~1853 | 1783~1793 | +5, Shift 60 |
| 12 | 1854~1858 | 1794~1803 | +5, Shift 55 |
| 11 | 1859~1863 | 1804~1813 | +5, Shift 50 |
| 10 | 1864~1867 | 1814~1822 | +5, Shift 45 |
| 9 | 1868~1870 | 1823~1830 | +5, Shift 40 |
| 8 | 1871~1873 | 1831~1838 | +5, Shift 35 |
| 7 | 1874~1876 | 1839~1846 | +5, Shift 30 |
| 6 | 1877~1878 | 1847~1853 | +5, Shift 25 |
| 5 | 1879~1880 | 1854~1860 | +5, Shift 20 |
| 4 | 1881~1882 | 1861~1867 | +5, Shift 15 |
| 3 | 1883~1884 | 1868~1874 | +5, Shift 10 |
| 2 | 1885~1886 | 1875~1881 | +5, Shift 5 |
| 1 | 1887 | 1882~1887 | +5 |

Table 3 shows an example that the sequential changer 771 included in the zooming speed determiner 770 calculates a secondary zooming speed, where a primary zooming speed is sequentially changed from a section of a zoom lens corresponding to the lowest zooming speed to a section of the zoom lens corresponding to the highest zooming speed.

In Table. 3, the number 5 of +5 is a margin value indicating a width of a section of a zoom lens to be widened, and Shift N (here, N is an integer number) is an accumulated value showing how much a section of a zoom lens system is shifted from a section of the zoom lens before being changed.

The sequential changer 771 may determine a margin value for calculating a secondary zooming speed to a value other than 5 by taking into account the number of focus moving times that are greater than a unit time.

Referring to Table 3, as the sequential changer 771 sequentially changes a primary zooming speed at each position of a zoom lens stored by storage 710 from a section of the zoom lens corresponding to the lowest zooming speed to a section of the zoom lens corresponding to the highest zooming speed, changes of widths of sections of the zoom lens are accumulated, and thus reduction of a zooming speed may be expected around a zooming speed of 20 steps/VD.

Referring to Table 2, when a position of the zoom lens is 1880, a secondary zooming speed is significantly reduced to 2 steps/VD from a primary zooming speed of 5 steps/VD. However, when a position of the zoom lens is 1800, both a primary zooming speed and a secondary zooming speed are 18 steps/VD. Therefore, a position of the zoom lens at which the reduction of a zooming speed is not applied is formed, and thus it is necessary to obtain a secondary zooming speed by repeating a number of operations.

However, referring to Table 3, when a position of the zoom lens is 1880, a secondary zooming speed is further reduced to 2 steps/VD from a primary zooming speed of 5 steps/VD. Furthermore, when a position of the zoom lens is 1800, a secondary zooming speed is further reduced to 12 steps/VD from a primary zooming speed of 18 steps/VD.

The margin value 5 used for changing positions of the zoom lens and sections of the zoom lens is an example value and may be appropriately increased from 1 to a value at which deterioration of zoom tracking performance does not occur.

TABLE 4

| Zooming Speed | Zoom Lens Section I | Margin Value, Section Movement Value | Zoom Lens Section II | Margin Value, Section Movement Value |
|---|---|---|---|---|
| 32(Max) | 0~806 | +5, Shift 155 | 0~856 | +0, Shift 100 |
| 31 | 807~1113 | +5, Shift 150 | 857~1158 | +0, Shift 100 |
| 30 | 1114~1241 | +5, Shift 145 | 1159~1281 | +0, Shift 100 |
| 29 | 1242~1322 | +5, Shift 140 | 1282~1357 | +0, Shift 100 |
| 28 | 1323~1386 | +5, Shift 135 | 1358~1416 | +0, Shift 100 |
| 27 | 1387~1441 | +5, Shift 130 | 1417~1466 | +0, Shift 100 |
| 26 | 1442~1489 | +5, Shift 125 | 1467~1509 | +0, Shift 100 |
| 25 | 1490~1534 | +5, Shift 120 | 1510~1549 | +0, Shift 100 |
| 24 | 1535~1574 | +5, Shift 115 | 1550~1584 | +0, Shift 100 |
| 23 | 1575~1610 | +5, Shift 110 | 1585~1615 | +0, Shift 100 |
| 22 | 1611~1641 | +5, Shift 105 | 1616~1641 | +0, Shift 100 |
| 21 | 1642~1664 | +5, Shift 100 | 1642~1664 | +0, Shift 100 |
| 20 | 1665~1688 | +5, Shift 95 | 1665~1688 | +5, Shift 95 |
| 19 | 1689~1709 | +5, Shift 90 | 1689~1709 | +5, Shift 90 |
| 18 | 1710~1727 | +5, Shift 85 | 1710~1727 | +5, Shift 85 |
| 17 | 1728~1743 | +5, Shift 80 | 1728~1743 | +5, Shift 80 |
| 16 | 1744~1757 | +5, Shift 75 | 1744~1757 | +5, Shift 75 |
| 15 | 1758~1770 | +5, Shift 70 | 1758~1770 | +5, Shift 70 |
| 14 | 1771~1782 | +5, Shift 65 | 1771~1782 | +5, Shift 65 |
| 13 | 1783~1793 | +5, Shift 60 | 1783~1793 | +5, Shift 60 |
| 12 | 1794~1803 | +5, Shift 55 | 1794~1803 | +5, Shift 55 |
| 11 | 1804~1813 | +5, Shift 50 | 1804~1813 | +5, Shift 50 |
| 10 | 1814~1822 | +5, Shift 45 | 1814~1822 | +5, Shift 45 |
| 9 | 1823~1830 | +5, Shift 40 | 1823~1830 | +5, Shift 40 |
| 8 | 1831~1838 | +5, Shift 35 | 1831~1838 | +5, Shift 35 |
| 7 | 1839~1846 | +5, Shift 30 | 1839~1846 | +5, Shift 30 |
| 6 | 1847~1853 | +5, Shift 25 | 1847~1853 | +5, Shift 25 |
| 5 | 1854~1860 | +5, Shift 20 | 1854~1860 | +5, Shift 20 |
| 4 | 1861~1867 | +5, Shift 15 | 1861~1867 | +5, Shift 15 |
| 3 | 1868~1874 | +5, Shift 10 | 1868~1874 | +5, Shift 10 |
| 2 | 1875~1881 | +5, Shift 5 | 1875~1881 | +5, Shift 5 |
| 1 | 1882~1887 | +5 | 1882~1887 | +5 |

Table 4 shows a secondary zooming speed based on Table 3 and a secondary zooming speed obtained by changing sections of a zoom lens differently around a particular zooming speed to obtain a zooming speed that is faster than the primary zooming speed shown in FIG. 3.

In a camera, a zooming speed is determined based on a sum of time periods elapsed for changing a position of the zoom lens from the wide angle end (0 step) to the telephoto end (1887 steps). As described above with reference to FIG. 4, deterioration of zoom tracking performance does not occur when a position of the zoom lens is near at the wide angle end, and thus it is not necessary to significantly reduce a zooming speed when a position of the zoom lens is near at the wide angle end as shown in Table 3.

In Table 4, comparing a zoom lens section I to a zoom lens section II, the zoom lens section I is identical to the zoom lens section II at zooming speeds from 1 step/VD to 22 steps/VD, and no margin value is applied to the zoom lens section II only from a zooming speed from 22 steps/VD. Since no margin value is applied when a position of the zoom lens is near at the wide angle end, a faster zooming speed may be secured at a position of the zoom lens at which it is clearly expected that the deterioration of zoom tracking performance will not occur.

For example, referring to the zoom lens section I, when a position of the zoom lens is 850, a corresponding zooming speed is 31 steps/VD. However, referring to the zoom lens section II, a zooming speed may be maintained at the highest zooming speed, which is 32 steps/VD, at the same position of the zoom lens. In the same regard, even when a position of the zoom lens is 1250, zoom lens in camera may be moved at a faster zooming speed in the zoom lens section II than in the zoom lens section I at the same position of the zoom lens.

Figure 8:
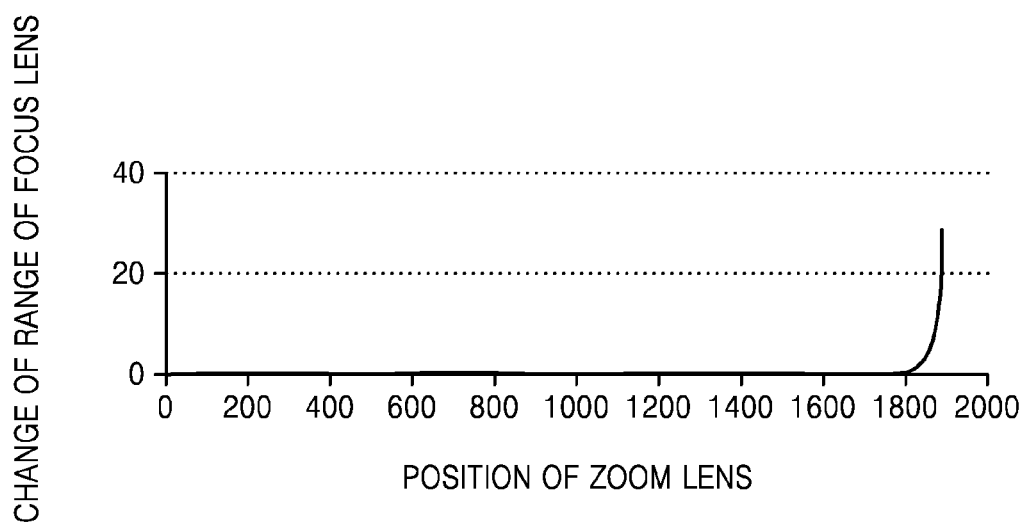
FIG. 8 is a graph showing changes of a range of the focus lens at each position of a zoom lens, according to an exemplary embodiment.

FIG. 8 is a graph showing a change of a range of the focus lens at each position of a zoom lens.

The graph shown in FIG. 8 may be calculated from the graph shown in FIG. 2.

$$df_d(z_p) = f_d(z_p) - f_d(z_p - 1) \quad \text{[Equation 5]}$$

In Equation 5, $df_d(z_p)$ indicates a change of a range of a focus lens when a position of a zoom lens is $z_p$, $f_d(z_p)$ indicates the range of the focus lens when a position of a zoom lens is $z_p$, and $f_d(z_p - 1)$ indicates the range of the focus lens when a position of a zoom lens is less than $z_p$ by 1.

$$df_d(1800) = f_d(1800) - f_d(1.799) = 486 - 483 = 3 \quad \text{[Equation 6]}$$

Equation 6 exemplifies a result obtained by substituting 1800 for $z_p$ in Equation 5. The graph shown in FIG. 8 includes a change of a range of the focus lens with respect to a position of the zoom lens according to Equation 6.

If a change of a range of a focus lens according to a position of the zoom lens is greater than a pre-set value, the sequential changer 771 does not apply a margin value to change a section of a zoom lens moving at a zooming speed that is slower than that of a section of the zoom lens including the corresponding position of the zoom lens. In other words, a position of a zoom lens in the case where a change of a range of a focus lens according to a position of the zoom lens is greater than a pre-set value is a reference to not to apply a margin value, where a zooming speed corresponding to the position of the zoom lens in the case where a change of a range of a focus lens is greater than the pre-set value, may be referred to as reference zooming speed for distinction from other zooming speeds.

A change of a range of a focus lens according to a position of the zoom lens that is greater than a pre-set value indicates that, if the zoom lens is continuously moved toward the telephoto end, deterioration of zoom tracking performance may occur.

Comparing the primary zooming speed of Table 3 to sections in Table 4 to which no margin value is applied, a change of a range of the focus lens is greater than the pre-set value when a position of the zoom lens is between 1742 and 1764, and thus a section of the zoom lens from 1742 to 1764 becomes a reference to which a margin value is not applied.

TABLE 5

| Zooming Speed | Zoom Lens Section II | Margin Value, Section Movement Value | Zoom Lens Section III | Margin Value, Section Movement Value |
| --- | --- | --- | --- | --- |
| 32(Max.) | 0~856 | +0, Shift 100 | 0~911 | −5, Shift 35 |
| 31 | 857~1158 | +0, Shift 100 | 912~1208 | −5, Shift 40 |
| 30 | 1159~1281 | +0, Shift 100 | 1209~1326 | −5, Shift 45 |
| 29 | 1282~1357 | +0, Shift 100 | 1327~1397 | −5, Shift 50 |
| 28 | 1358~1416 | +0, Shift 100 | 1398~1451 | −5, Shift 55 |
| 27 | 1417~1466 | +0, Shift 100 | 1452~1496 | −5, Shift 60 |
| 26 | 1467~1509 | +0, Shift 100 | 1497~1534 | −5, Shift 65 |
| 25 | 1510~1549 | +0, Shift 100 | 1535~1569 | −5, Shift 70 |
| 24 | 1550~1584 | +0, Shift 100 | 1570~1599 | −5, Shift 75 |
| 23 | 1585~1615 | +0, Shift 100 | 1600~1625 | −5, Shift 80 |
| 22 | 1616~1641 | +0, Shift 100 | 1626~1646 | −5, Shift 85 |
| 21 | 1642~1664 | +0, Shift 100 | 1647~1664 | −5, Shift 90 |
| 20 | 1665~1688 | +5, Shift 95 | 1665~1688 | +5, Shift 95 |

Table 5 shows the zoom lens section II based on Table 4 and a zoom lens section III to which an inverse margin value (negative margin value) based on an application of a reference to not apply a margin value, which is calculated according to Equation 5.

In the zoom lens section III, when a position of the zoom lens is near at the wide angle end, the width of a section of the zoom lens is narrowed by applying an inverse margin value (negative margin value) to a section of the zoom lens, and thus the number of positions of the zoom lens, at which the zoom lens may be moved at faster zooming speed, may be greater than in the zoom lens section II.

Referring to the zoom lens section II, when a position of the zoom lens is 900, a zooming speed is 31 steps/VD. However, referring to the zoom lens section III, a zooming speed may be maintained at the highest zooming speed, which is 32 steps/VD, at the same position of the zoom lens. Furthermore, referring to the zoom lens section II, when a position of the zoom lens is 1200, a zooming speed is 30 steps/VD. However, referring to the zoom lens section III, a zooming speed may be maintained at 31 steps/VD, at the same position of the zoom lens.

As described above with respect to Tables 3 through 5, the sequential changer 771 may determine an optimal zooming speed in each position of the zoom lens by sequentially changing a section of the zoom lens corresponding to the respective zooming speeds from a section of the zoom lens corresponding to the lowest zooming speed to a section of the zoom lens corresponding to the highest zooming speed.

Figure 9:
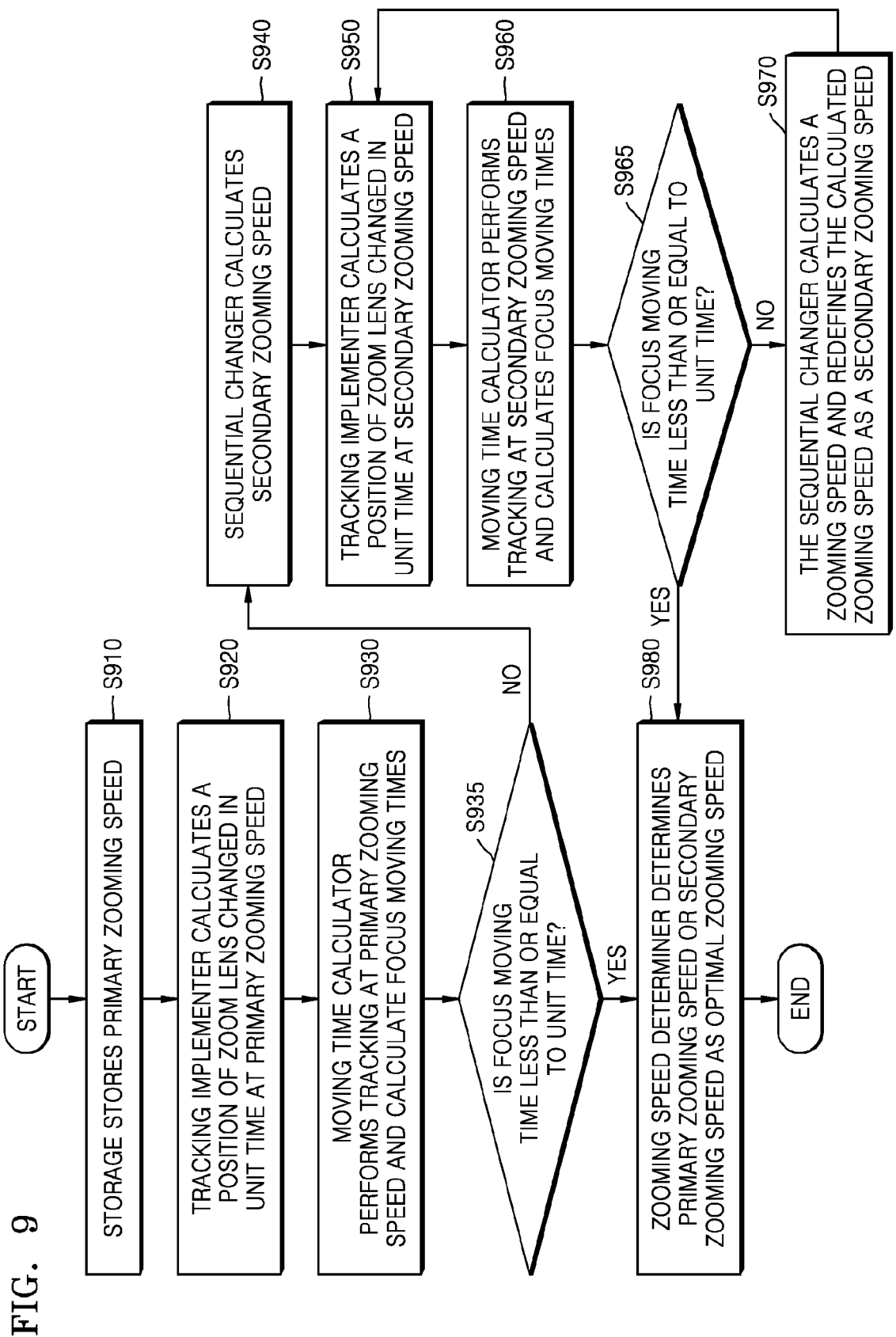
FIG. 9 is a flowchart showing a method of determining an optimal zooming speed according to another exemplary embodiment.

FIG. 9 is a flowchart showing a method of determining an optimal zooming speed according to another exemplary embodiment.

Descriptions of components identical to those shown in FIG. 6 will be omitted.

A storage stores a zooming speed at each section of a zoom lens (operation S610). The zooming speed at each section of a zoom lens stored in the storage (primary zooming speed) may be experimentally obtained by using a camera and a measuring device that are embodied as hardware or may be quickly obtained according to Equation 4 stated above. Here, a section of a zoom lens includes at least two positions of the zoom lens.

A tracking implementer calculates a position of the zoom lens changed at a zooming speed at each position of a zoom lens in a unit time (operation S920). The changed position of the zoom lens is determined based on the locus data graph described above with reference to FIG. 2.

A moving time calculator calculates a difference between a position of the focus lens corresponding to a position of the zoom lens before the position of the zoom lens is changed in the tracking implementer and a position of the focus lens corresponding to changed position of the zoom lens, and also calculates a focus moving time by dividing the difference by the highest moving speed of the focus lens (operation S930).

A sequential changer included in a zooming speed determiner determines whether a focus moving time calculated by the moving time calculator is less than or equal to a unit time (operation S935).

If a focus moving time calculated by the moving time calculator is greater than the unit time, the sequential changer calculates a secondary zooming speed by reducing a primary zooming speed stored in the storage (operation S940).

The primary zooming speed may be reduced to calculate the secondary zooming speed by changing widths of sections of the zoom lens at once by a particular value, as shown in Table 2, or sequentially changing widths of sections of the zoom lens from a section of the zoom lens corresponding to the lowest zooming speed to a section of the zoom lens corresponding to the highest zooming speed, as shown in Tables 3 through 5.

The sequential changer may calculate a secondary zooming speed from a primary zooming speed by using a margin value 1. For example, referring to Table 1, when the margin value of 1 is applied to a section of a zoom lens system corresponding to the lowest zooming speed, a position of the zoom lens moving at a zooming speed of 1 step/VD, which is 1887 steps, is changed to a section from 1886 steps to 1887 steps of the zoom lens.

By taking into account the number of focus moving times that are greater than a unit time, the sequential changer may apply a margin value that is greater than 1 to calculate the secondary zooming speed.

Next, a section from 1885 steps to 1886 steps of a zoom lens moving at 2 steps/VD is changed to a section from 1883 steps to 1885 steps. A plurality of different zooming speed may not correspond to a single position of a zoom lens, and the previous section of the zoom lens including two steps, 1885 steps and 1886 steps, become to include 3 steps, 1883 steps, 1884 steps, and 1885 steps. The sequential changer calculates a secondary zooming speed by repeatedly performing the above-stated operations on each of the sections of a zoom lens.

A tracking implementer calculates a position of the zoom lens changed in a unit time at a secondary zooming speed (operation S950). The changed position of the zoom lens is determined based on the locus data graph as described above with reference to FIG. 2.

A moving time calculator calculates a difference between a position of the focus lens corresponding to a position of the zoom lens before being changed and a position of the focus lens corresponding to the changed position of the zoom lens, and also calculates a focus moving time by dividing the difference between positions of the focus lens by the highest moving speed of the focus lens (operation S960). In the operation S960, a speed at which the zoom lens moves from the position before being changed to the changed position is based on the secondary zooming speed calculated in the operation S950.

A sequential changer included in a zooming speed determiner determines whether a focus moving time calculated by the moving time calculator is less than or equal to a unit time (operation S965).

If the focus moving time calculated in the operation S960 by the moving time calculator is greater than the unit time, the sequential changer calculates a zooming speed by reducing a primary zooming speed stored in the storage and redefines the calculated zooming speed as a secondary zooming speed (operation S970). The secondary zooming speed calculated in the operation S970 may be calculated by applying a margin value that is greater by 1 than the margin value applied to the primary zooming speed in the operation S940, where 1 is an example value and numbers other than 1 may also be applied.

For example, the sequential changer may calculate a secondary zooming speed from primary zooming speed by applying a margin value 2. For example, referring to Table 1, when the margin value 2 is applied to a section of a zoom lens system corresponding to the lowest zooming speed, a position of the zoom lens moving at a zooming speed of 1 step/VD, which is 1887 steps, is changed to a section from 1885 steps to 1887 steps of the zoom lens.

Next, the sequential changer changes a section from 1885 steps to 1886 steps of a zoom lens moving at 2 steps/VD to a section from 1881 steps to 1884 steps. A plurality of different zooming speeds may not correspond to a single position of a zoom lens, and the previous section of the zoom lens including two steps 1885 steps and 1886 steps become to include 4 steps 1881 steps, 1882 steps, 1883 steps, and 1884 steps. The sequential changer calculates a new secondary zooming speed by repeatedly performing the above-stated operations on each of the sections of a zoom lens.

If the focus moving time calculated by the moving time calculator based on the secondary zooming speed calculated in the operation S970 is greater than a unit time, the zooming speed determiner repeatedly performs the operation S950 and the operation S970.

If the focus moving time calculated by the moving time calculator based on the secondary zooming speed calculated in the operation S970 is less than or equal to a unit time, the zooming speed determiner determines a primary zooming speed stored in the storage or a secondary zooming speed calculated by the sequential changer in the operations S940 through S970 as an optimal zooming speed based on a position of the zoom lens (operation S980).

The secondary zooming speed calculated in the operation S940 and S970 may be calculated not only by using the method described above with reference to Table 3, but also by using the method described above with reference to Tables 4 and 5 by not applying a margin value or by applying an inverse margin value based on a particular position of the zoom lens.

The inventive concept can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributed fashion. (Also, functional programs, codes, and code segments for accomplishing the present inventive concept can be easily construed by programmers skilled in the art to which the present inventive concept pertains.)

At least one of the components, elements or units represented by a block as illustrated in FIGS. 1 and 7 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

According to an apparatus and method for determining an optimal zooming speed, an optimal zooming speed at which a zoom lens may move while focus is set may be accurately and quickly obtained in correspondence to each position of a zoom lens. If a zooming speed calculated according to the inventive concept is applied to a camera supporting auto zoom tracking, focus may be maintained while minimizing a time that elapses for changing zoom power.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the drawings, it will be understood by those of ordinary skill in the art that various changes in form and details may be made therein without departing from the spirit and scope of the inventive concept as defined by the following claims.

What is claimed is:

1. An optimal zooming speed determining device comprising:
   a storage configured to store a zooming speed at each position of a zoom lens;
   a tracking implementer configured to calculate a position of the zoom lens changed in a unit time at a zooming speed at the each position of the zoom lens;
   a moving time calculator configured to calculate a difference between a position of a focus lens corresponding to a position of the zoom lens before the position of the zoom lens is changed and a position of the focus lens corresponding to the changed position of the zoom lens, and calculate a focus moving time by dividing the difference between positions of the focus lens by a highest moving speed of the focus lens from among a plurality of preset moving speeds of the focus lens; and a zooming speed determiner configured to reduce the zooming speed at the each position of the zoom lens stored in the storage, if the focus moving time is greater than the unit time.

2. The optimal zooming speed determining device of claim 1, wherein the zooming speed at the each position of the zoom lens is calculated from locus data regarding a distance between an object and a zoom lens system comprising the zoom lens and the focus lens.

3. The optimal zooming speed determining device of claim 2, wherein the locus data comprises:
locus data corresponding to a case at which the object is located at an infinite distance from the zoom lens system;
and locus data corresponding to a case at which the object is a minimum object distance (MOD) distance from the zoom lens system,
and wherein the MOD distance is a smallest distance with guaranteed resolving power.

4. The optimal zooming speed determining device of claim 1, wherein the zooming speed determiner is configured to reduce the zooming speed at the each position of the zoom lens by changing a position of the zoom lens corresponding to each zooming speed.

5. The optimal zooming speed determining device of claim 1, wherein, at the storage, the position of the zoom lens corresponds to a section of the zoom lens comprising a plurality of positions of the zoom lens, and
wherein the zooming speed determiner is configured to change positions of the zoom lens corresponding to respective zooming speeds.

6. The optimal zooming speed determining device of claim 5, wherein the zooming speed determiner is configured to sequentially change a plurality of sections of the zoom lens corresponding to the respective zooming speeds from a section of the zoom lens corresponding to a lowest zooming speed to a section of the zoom lens corresponding to a highest zooming speed,
wherein each of the sections of the zoom lens comprises a plurality of positions of the zoom lens, and
wherein the lowest and highest zooming speeds are selected from among a plurality of zooming speeds at respective positions of the zoom lens stored in the storage.

7. The optimal zooming speed determining device of claim 1, wherein the zooming speed determiner is configured to cumulatively change a plurality of sections of the zoom lens corresponding to respective zooming speeds by a pre-set margin value from a section of the zoom lens corresponding to a lowest zooming speed to a section of the zoom lens corresponding to a highest zooming speed,
wherein each of the sections of the zoom lens comprises a plurality of positions of the zoom lens, and
wherein the lowest and highest zooming speeds are selected from among a plurality of zooming speeds at respective positions of the zoom lens stored in the storage.

8. The optimal zooming speed determining device of claim 7, wherein the zooming speed determiner is configured to cumulatively change the plurality of sections of the zoom lens corresponding to the respective zooming speeds by the margin value from a section of the zoom lens corresponding to the lowest zooming speed to a section of the zoom lens corresponding to a reference zooming speed,
wherein the reference zooming speed is a zooming speed that is lower than the highest zooming speed, and
wherein the lowest and highest zooming speeds are selected from among a plurality of zooming speeds at respective positions of the zoom lens stored in the storage.

9. The optimal zooming speed determining device of claim 8, wherein the reference zooming speed is a zooming speed corresponding to a position of the zoom lens at which a change of a range of the focus lens is greater than a pre-set value, and
wherein the range of the focus lens is a range to move the focus lens as the zoom lens moves.

10. The optimal zooming speed determining device of claim 7, wherein the zooming speed determiner is configured to cumulatively change the plurality of sections of the zoom lens corresponding to the respective zooming speeds by a pre-set inverse margin value from a section of the zoom lens corresponding to a speed higher than the reference zooming speed to a section of the zoom lens corresponding to the highest zooming speed.

11. A method of determining an optimal zooming speed, the method comprising:
storing a zooming speed at each position of a zoom lens;
calculating a position of the zoom lens changed in a unit time at a zooming speed at the each the position of the zoom lens;
calculating a difference between a position of a focus lens corresponding to a position of the zoom lens before the position of the zoom lens is changed and a position of the focus lens corresponding to the changed position of the zoom lens, and calculating a focus moving time by dividing the difference between positions of the focus lens by a highest moving speed of the focus lens from among a plurality of preset moving speeds of the focus lens; and
reducing the zooming speed at the each position of the zoom lens, if the focus moving time is greater than the unit time.

12. The method of claim 11, wherein the zooming speed at the each position of the zoom lens is calculated from locus data regarding a distance between an object and a zoom lens system comprising the zoom lens and the focus lens.

13. The method of claim 12, wherein the locus data comprises:
locus data corresponding to a case at which the object is located at an infinite distance from the zoom lens system; and
locus data corresponding to a case at which the object is a MOD distance from the zoom lens system, and
wherein the MOD distance is a smallest distance with guaranteed resolving power.

14. The method of claim 11, wherein the zooming speed at the each position of the zoom lens is reduced by changing a position of the zoom lens corresponding to each zooming speed.

15. The method of claim 11, wherein the position of the zoom lens corresponds to a section of the zoom lens comprising a plurality of positions of the zoom lens, and
wherein the method further comprises changing positions of the zoom lens corresponding to respective zooming speeds.

16. The method of claim 15, further comprising sequentially changing a plurality of sections of the zoom lens corresponding to the respective zooming speeds from a section of the zoom lens corresponding to a lowest zooming speed to a section of the zoom lens corresponding to a highest zooming speed, wherein each of the sections of the zoom lens comprises a plurality of positions of the zoom lens, and wherein the lowest and highest zooming speeds are selected from among a plurality of zooming speeds at respective positions of the zoom lens stored in the storage.

17. The method of claim 11, further comprising cumulatively changing a plurality of sections of the zoom lens corresponding to respective zooming speeds by a pre-set margin value from a section of the zoom lens corresponding to a lowest zooming speed to a section of the zoom lens corresponding to a highest zooming speed, wherein each of the sections of the zoom lens comprises a plurality of positions of the zoom lens, and wherein the lowest and highest zooming speeds are selected from among a plurality of zooming speeds at respective positions of the zoom lens stored in the storage.

18. The method of claim 17, wherein the cumulatively changing comprises cumulatively changing the plurality of sections of the zoom lens corresponding to the respective zooming speeds by the margin value from a section of the zoom lens corresponding to the lowest zooming speed to a section of the zoom lens corresponding to a reference zooming speed, and wherein the reference zooming speed is a zooming speed that is lower than the highest zooming speed, and wherein the lowest and highest zooming speeds are selected from among a plurality of zooming speeds at respective positions of the zoom lens stored in the storage.

19. The method of claim 18, wherein the reference zooming speed is a zooming speed corresponding to a position of the zoom lens at which a change of a range of the focus lens is greater than a pre-set value, and wherein the range of the focus lens is a range to move the focus lens as the zoom lens moves.

20. The method of claim 17, further comprising cumulatively changing the plurality of sections of the zoom lens corresponding to the respective zooming speeds by a pre-set inverse margin value from a section of the zoom lens corresponding to a speed higher than the reference zooming speed to a section of the zoom lens corresponding to the highest zooming speed.

* * * * *